US005539711A

United States Patent [19]
Mitani

[11] Patent Number: 5,539,711
[45] Date of Patent: Jul. 23, 1996

[54] OPTICAL DISC DRIVE APPARATUS

[75] Inventor: Akira Mitani, Kanagawa, Japan

[73] Assignee: Sony Corporation, Tokyo, Japan

[21] Appl. No.: 333,277

[22] Filed: Nov. 2, 1994

[30] Foreign Application Priority Data

Nov. 8, 1993 [JP] Japan .................................. 5-278566

[51] Int. Cl.⁶ ...................................................... G11B 7/00
[52] U.S. Cl. ................................................ 369/32; 369/54
[58] Field of Search ................................ 369/32, 54, 47, 369/48, 55, 56

[56] References Cited

U.S. PATENT DOCUMENTS

| | | | |
|---|---|---|---|
| 5,237,553 | 8/1993 | Fukushima et al. | 369/32 |
| 5,319,627 | 6/1994 | Shinno et al. | 369/32 |

*Primary Examiner*—David C. Nelms
*Assistant Examiner*—Vu A. Le
*Attorney, Agent, or Firm*—Limbach & Limbach; Philip M. Shaw, Jr.

[57] ABSTRACT

A reproducing apparatus includes access means for accessing a recording medium so that an information signal is read out from the recording medium, detecting means for counting frequency with which the access means accesses the same recording unit region of the recording medium and detecting a recording unit region of high access frequency, random number generating means for generating a random number, and moving means for moving the access means to other recording unit region on the recording medium in response to a random number generated from the random number generating means after the access means accesses the recording unit region of high access frequency detected by the detecting means.

32 Claims, 12 Drawing Sheets

TRACK OF HIGHEST FREQUENCY IN ACCESS

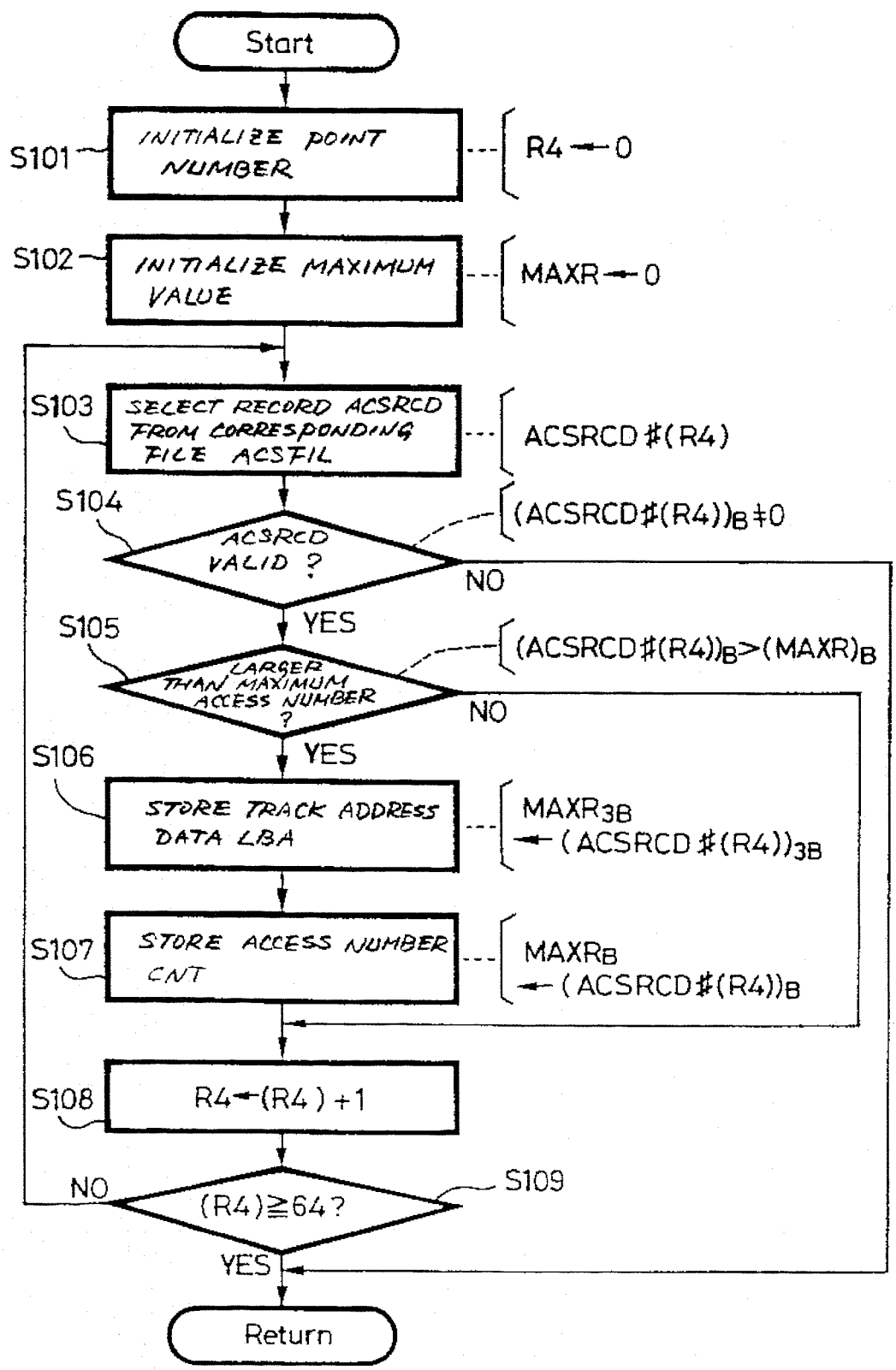

FIG. 9

ACCESS REQUEST INFORMATION : ACSINF

| SYC | DEVICE NO. (DNO) | TRACK ADDRESS (LBA) | SECTOR ADDRESS (SBA) | RECORD LENGTH (LENGTH) |

FREQUENCY DETECTION INFORMATION (INF)

OPTICAL DISC DRIVE APPARATUS

BACKGROUND OF THE INVENTION

The present invention relates to an optical disc drive apparatus and, more particularly, is directed to an optical disc drive apparatus for use with a recording and reproducing apparatus using a phase-change type optical disc as a recording medium.

A recording and reproducing apparatus for recording and reproducing information signal with radiation of laser beams uses a disk-shaped recording medium (simply referred to hereinafter as "optical disc"). Such recording medium might be a read-only optical disc, a write-once optical disc in which an information signal can be written once and an optical disc using a magneto-optical recording medium in and from which an information signal can be recorded and erased a plurality of times.

The read-only optical disc includes a track on which uneven patterns, i.e., pits are formed concentrically or spirally formed on one surface thereof. Specifically, this optical disc is composed of a disc substrate made of a transparent synthetic material, such as polycarbonate, PMMA {poly (methyl methacrylate)} or the like, a reflection film made of a metal such as Al or Au so as to cover phase pits formed on one surface of the disc substrate and a protection film formed so as to cover the reflection film in order to protect the reflection film.

As the write-once optical disc, there is proposed a phase-change type optical disc which can form pits with high density. The phase-change type optical disc is composed of a transparent substrate in which pits are formed on the surface and a phase-change film formed on the transparent substrate. The phase-change film is at least one selected from $Sb_2Se_3$, $Sb_2Te_3$, Se, Te, BiTe, BiSe, In-Se, In-Sb-Te, In-SbSe, In-Se-$Tb_1$, Ge-Te-Sb and Ge-Te.

A magneto-optical disc using a vertical magnetic recording medium or the like is known as a recordable optical disc.

This magneto-optical disc is composed of a disc substrate in which guide grooves for guiding laser beam are formed on one surface and which is made of a transparent synthetic resin such as polycarbonate, PMMA or the like, a recording layer made of a vertical magnetic recording material, such as Te, Fe, Co or the like, the recording layer being formed so as to cover the guide grooves, and a protection layer formed so as to cover the recording layer in order to protect the protecting layer.

A method of reproducing these optical discs will be described below. When the read-only optical disc and the write-once optical disc are reproduced, laser beam from a laser light source is radiated on the optical disc substrate under the condition that the laser beam is converged by an objective lens. Reflected light flux that was modulated by phase pits of the optical disc is detected by a photodetector, for example, and a reproduced signal of the information signal recorded on the optical disc is obtained by obtaining a detected signal having signal level corresponding to intensity of the reflected light flux.

When the latter recordable optical disc is reproduced, similarly to the read-only optical disc, laser beam from the laser light source is radiated on the disc substrate under the condition that the laser beam is converged by the objective lens. Then, a reproduced signal of the information signal recorded on the magneto-optical disc is reproduced by detecting a Kerr rotational angle in the reflected light flux modulated by the recording layer of the optical disc.

However, in the recording and reproducing apparatus, if data on the same track is periodically accessed at a cycle within a predetermined time, then it is frequently observed that the optical head is not returned to the home position so that the optical head stays on the same track. In this case, reproducing laser beam emitted from the optical head is radiated on the same track for a long period of time with the result that the track portion radiated by the reproducing laser beam is locally heated. There is then the risk that the optical disc itself is deformed by heat.

To solve the aforementioned problem, it is proposed to reduce a time ("predetermined time") in which the optical head is stopped on the same time. However, according to this proposed method, a frequency with which the optical head is moved to the home position is increased. There is then the risk that access efficiency is lowered.

Relationship between the frequency in which the optical head is moved to the home position and the efficiency in which the optical head accesses data is so-called trade-off relationship. Accordingly, it is not possible to satisfy both of the frequency and the access efficiency in response to all sorts of manners in which the recording and reproducing apparatus and the optical disc are in use.

OBJECTS AND SUMMARY OF THE INVENTION

It is therefore an object of the present invention to provide a recording and reproducing apparatus in which it is possible to avoid in advance an access head from being stopped at the same position for a long period of time.

Another object of the present invention is to provide a recording and reproducing apparatus in which an access speed can be increased.

Still another object of the present invention is to provide a recording and reproducing apparatus in which it is possible to prevent in advance heat from being accumulated in an optical disc when reproducing laser beam radiates the same position of the optical disc for a long period of time if the present invention is applied to an apparatus for recording and reproducing a phase-change type optical disc.

A further object of the present invention is to provide a recording and reproducing apparatus in which a phase-change type optical disc can be accessed at high speed.

According to a first aspect of the present invention, there is provided a reproducing apparatus which is comprised of access means for accessing a recording medium so that an information signal is read out from the recording medium, detecting means for counting frequency with which the access means accesses the same recording unit region of the recording medium and detecting a recording unit region of high access frequency, random number generating means for generating a random number, and moving means for moving the access means to other recording unit region on the recording medium in response to a random number generated from the random number generating means after the access means accesses the recording unit region of high access frequency detected by the detecting means.

According to a second aspect of the present invention, there is provided a recording apparatus which is comprised of access means for accessing a recording medium so that an information signal is read out from the recording medium, detecting means for counting frequency with which the access means accesses the same recording unit region of the recording medium and detecting a recording unit region of high access frequency, random number generating means for generating a random number, and moving means for moving the access means to other recording unit region on the recording medium in response to a random number generated from the random number generating means after the access means accesses the recording unit region of high access frequency detected by the detecting means.

According to a third aspect of the present invention, there is provided a reproducing apparatus which is comprised of access means for accessing a recording medium so that an information signal is read out from the recording medium, detecting means for counting frequency with which the access means accesses the same recording unit region of the recording medium and detecting a recording unit region of high access frequency, and moving means for sequentially moving the access means within a recording unit region near recording unit region of high access frequency on the recording medium after the access means accesses the recording unit region of high access frequency detected by the detecting means.

In accordance with a fourth aspect of the present invention, there is provided a recording apparatus which is comprised of access means for accessing a recording medium so that an information signal is read out from the recording medium, detecting means for counting frequency with which the access means accesses the same recording unit region of the recording medium and detecting a recording unit region of high access frequency, and moving means for sequentially moving the access means within a recording unit region near recording unit region of high access frequency on the recording medium after the access means accesses the recording unit region of high access frequency detected by the detecting means.

In accordance with a fifth aspect of the present invention, there is provided an access method of accessing a recording medium by access means. The access method is comprised of the steps of (a) counting frequency with which the same recording unit region of a recording medium is accessed by access means and detecting a recording unit region of high access frequency, (b) detecting whether or not the recording unit region of high access frequency detected at step (a) is accessed by the access means, (c) generating a random number, and (d) moving the access means to other recording unit region on the recording medium in response to the random numbers after the recording unit region of high access frequency detected by the step (a) is accessed by the access means.

In accordance with a sixth aspect of the present invention, there is provided an access method of accessing a recording medium by access means. The access method is comprised of the steps of (a) counting frequency with which the same recording unit region of a recording medium is accessed by access means and detecting a recording unit region of high access frequency, (b) detecting whether or not the recording unit region of high access frequency detected at step (a) is accessed by the access means, and (c) sequentially moving the access means within a recording unit region near the recording unit region of high access frequency on the recording medium after the recording unit region of high access frequency detected by the step (a) is accessed by the access means.

The above, and other objects, features, and advantages of the present invention will become apparent from the following detailed description of preferred embodiments thereof to be taken in conjunction with the accompanying drawings.

BRIEF DESCRIPTION OF THE DRAWINGS

FIG. 7 is a flowchart showing a maximum access frequency detecting subroutine executed in the access frequency counting program;

FIG. 9 is a diagram used to explain an example of an region allocation of access request information (ACSINF) transmitted from the host computer to each recording and reproducing apparatus;

DETAILED DESCRIPTION OF THE PREFERRED EMBODIMENTS

A recording and reproducing apparatus according to the present invention will be described below with reference to FIGS. 1 through 11. In this embodiment, the recording and reproducing apparatus is applied to a recording and reproducing apparatus using a write-once phase-change type optical disc as a recording medium. This recording and reproducing apparatus will be referred to hereinafter as "inventive recording and reproducing apparatus" for simplicity.

Figure 1:
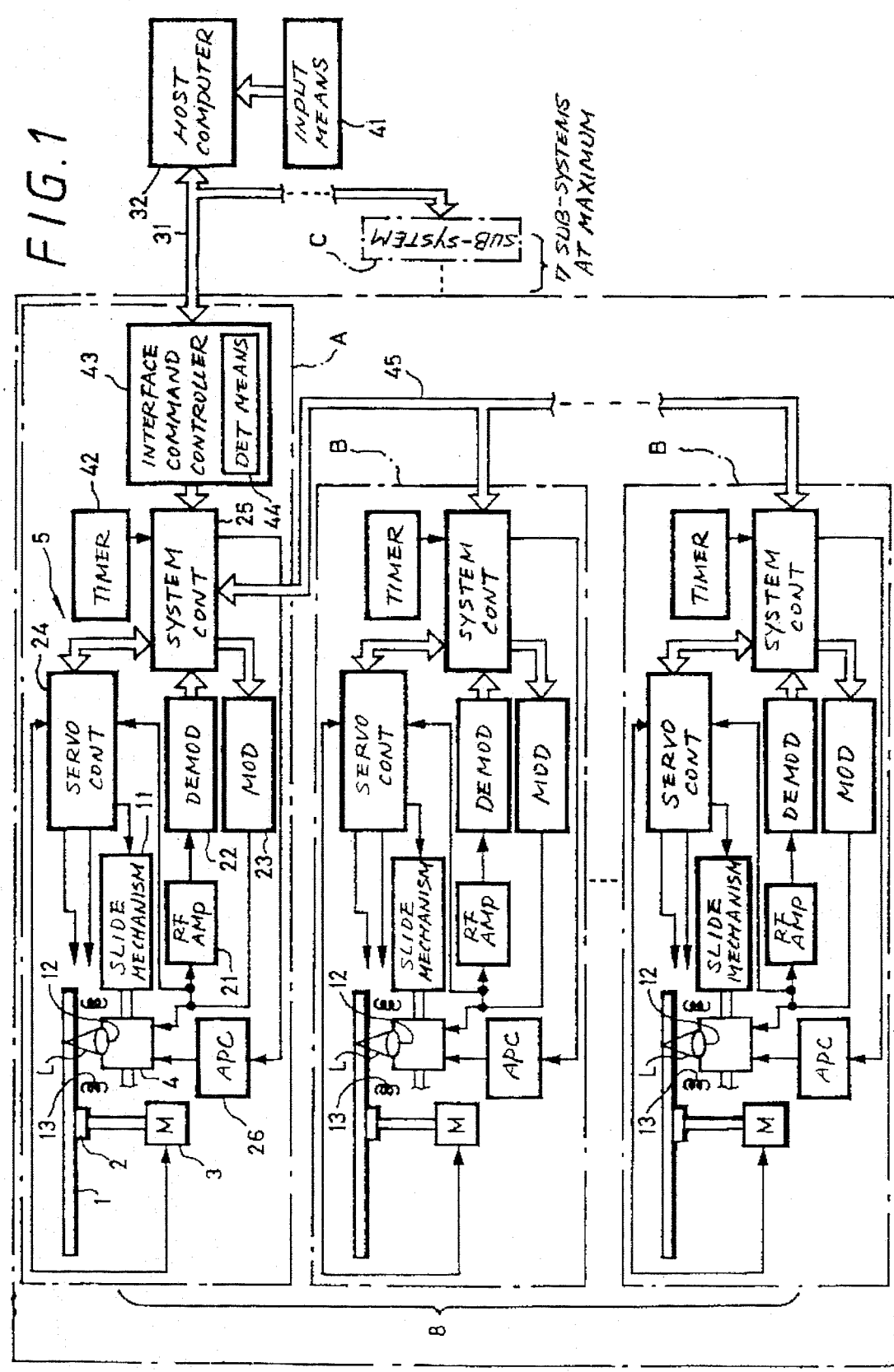
FIG. 1 is a block diagram showing an embodiment in which a recording and reproducing apparatus according to the present invention ius applied to a recording and reproducing apparatus using a write-once phase-change type optical disc as a recording medium and a system of a recording and reproducing apparatus including 7 sets of sub-systems formed of 8 recording and reproducing apparatus according to this embodiment connected through an interface bus to a host computer.

As shown in FIG. 1, the inventive recording and reproducing apparatus includes a turntable 2 on which a phase-change type optical disc (simply referred to hereinafter as "optical disc") 2 is loaded, a spindle motor (M) 3 for rotating the optical disc 1 loaded on the turntable 2 in a predetermined direction in a CLV (constant linear velocity) fashion or in a CAV (constant angular velocity) fashion, an optical head 4 for accessing (recording and reproducing) an information signal to the rotating optical disc 1 and a signal processor 5 for demodulating the reproduced data supplied thereto from the optical head 4 to supply reproduced data to the outside and also modulating writing data supplied thereto from the outside to supply a writing signal to the optical head 4.

Figure 2:
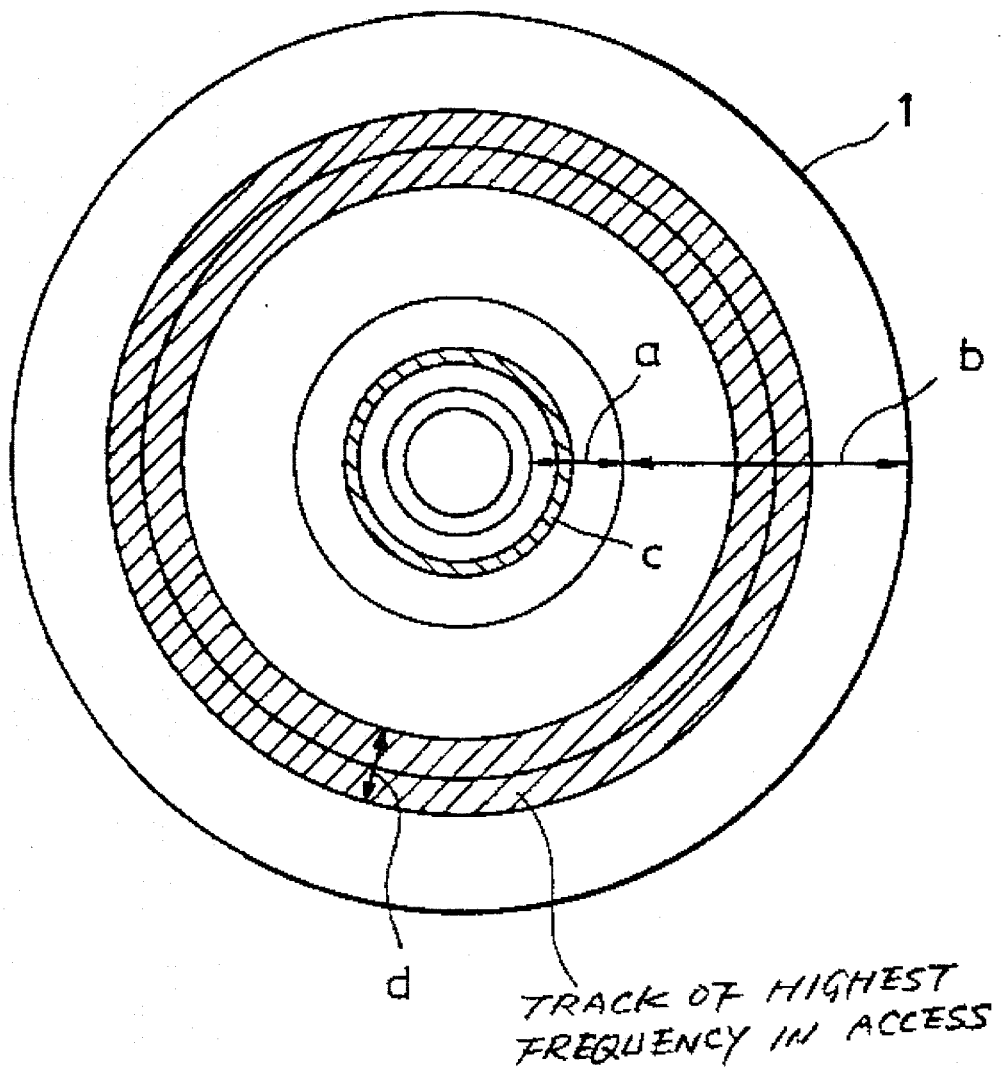
FIG. 2 is a diagram used to explain a recording format of an optical disc used in the recording and reproducing apparatus according to the present invention.

As shown in FIG. 2, the optical disc 1 includes a system region a provided on its inner peripheral portion to record data concerning attribute of the optical disc 1, such as rotation control system, i.e., CLV system, CAV system, and track pitch and the number of tracks, i.e., TOC (table of contents) data not as a phase-change material layer but as pit information based on concavities and convexities similarly to the compact disc (CD) and a user region b formed by the phase-change layer except the system region a in which the TOC data is recorded.

The optical head 4 can be moved in the diameter direction of the optical disc 1 by an optical head slide mechanism 11 composed of mainly a linear motor and a guide shaft, not shown, for example. The optical head 4 includes at least a semiconductor laser (not shown) disposed therein to serve as a light source for emitting laser beam, an objective lens 12 for converging laser beam L emitted from the semiconductor laser on the phase-change material layer (recording layer) of the optical disc 1, a photodetector (not shown) for detecting a reflected-back light obtained after the laser beam L emitted from the semiconductor laser was reflected on the optical disc 1 and converting the reflected-back light into an electrical signal and a beam splitter (not shown) for spatially splitting the reflected-back light and the light emitted from the semiconductor laser.

The objective lens 12 of the optical head 4 can be moved by a two-dimensional actuator 13 of a simple structure in very small ranges in the direction perpendicular to the optical disc 1 and the diameter direction of the optical disc 1. The two-dimensional actuator 13 includes magnetic circuit composed of a focusing coil, a tracking coil and a magnetic, for example, though not shown.

A signal processor 5 comprises a playback RF amplifier (RF AMP) 21 for amplifying a reproduced signal from the photodetector in the optical head 4, a demodulator (DEMOD) 22 for demodulating a reproduced amplified signal from the RF amplifier 21 and converting a demodulated reproduced amplified signal to digital reproduced data by decoding, such as error correction or the like, a modulator (MOD) 23 for modulating recording data supplied thereto from the outside in suitable modulation, such as an EFM (eight-to-fourteen modulation) or the like and converting modulated recording data to a binary signal serving as pit recording information, a servo controller (SERVO CONT) 24 for servo-controlling the spindle motor 3, the two-dimensional actuator 13 and the optical head slide mechanism 11 by servo signals and a system controller (SYSTEM CONT) 25 for controlling each of the above-mentioned elements in various manners. The signal processor 5 includes a laser beam controller (APC) 26 for controlling intensity of laser beam emitted from the semiconductor laser in the optical head 4.

There are prepared the 7 inventive sub-systems C at maximum. Each of the sub-system C includes a recording and reproducing apparatus A with an interface bus controller and a recording and reproducing apparatus B with a local bus. The recording and reproducing apparatus A can be connected with 7 recording and reproducing apparatus B at maximum. Specifically, the recording and reproducing apparatus A and a plurality of recording and reproducing apparatus B disposed under the recording and reproducing apparatus A constitute one sub-system C. The recording and reproducing apparatus system is arranged such that the sub-system C composed of a plurality of recording and reproducing apparatus is electrically connected through an interface bus (e.g., SCSI: small computer systems interface) 31 to a host computer 32 which monitors and controls a plurality of sub-systems C.

Figure 3:
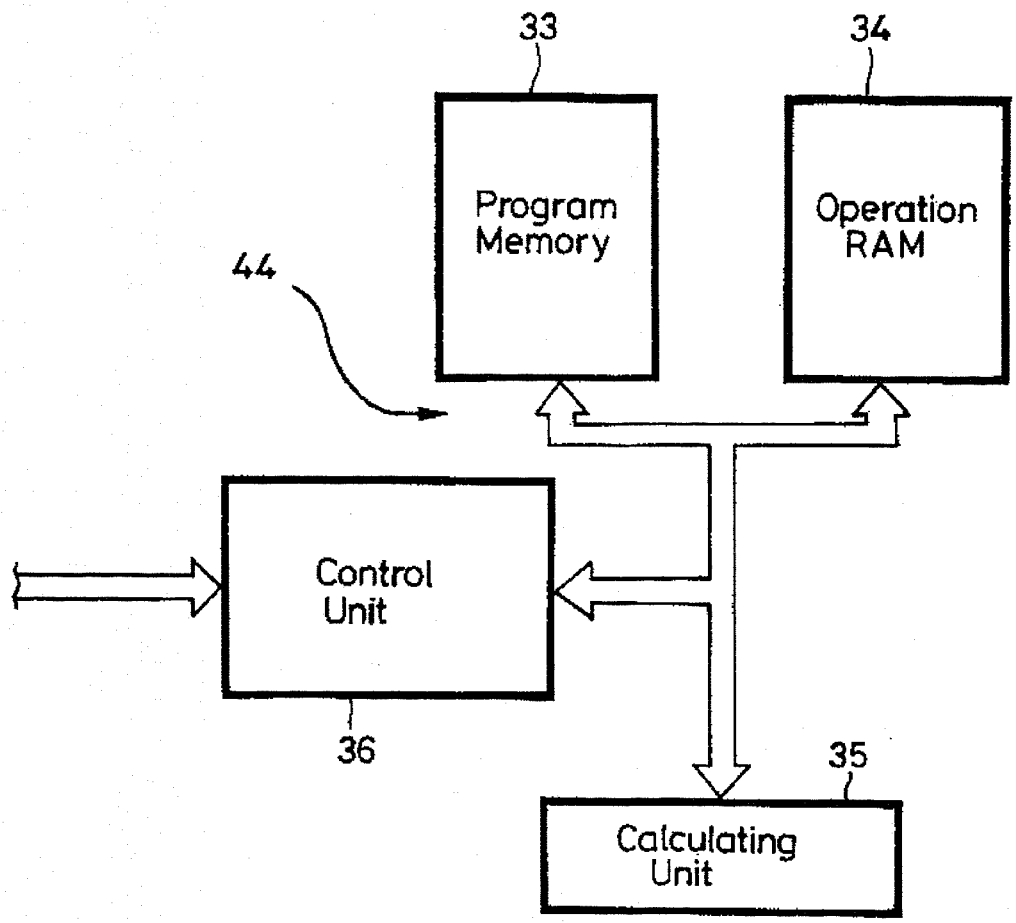
FIG. 3 is a block diagram schematically showing an inside arrangement of an interface command controller connected to the recording and reproducing apparatus according to the embodiment of the present invention.

As shown in FIG. 3, an interface command controller 43 includes a detecting means (DET MEANS) 44 composed of a program memory 33 in which various programs are registered, an operation RAM (random access memory) 34 used as an operation region of program read out from the program memory 33 and which is also used as a storage region for storing data table (file) thus made, a calculating unit 35 for processing and identifying data in accordance with an algorithm of the program stored in the operation RAM 34 and a control unit 36 for controlling the program memory 33, the operation RAM 34 and the calculating unit 35.

Operations and signal processings of the recording and reproducing apparatus system and the respective recording and reproducing apparatus will be described below under the assumption that a set of sub-system composed of 8 recording and reproducing apparatus is connected to the host computer 32 and that optical disc 1 is loaded on each of the recording and reproducing apparatus.

Initially, in each of the recording and reproducing apparatus, the optical head 4 reads out TOC data recorded on the system region a (see FIG. 2) of the optical disc 1. The system controller 25 detects on the basis of the read-out TOC data whether the format of the optical disc 1 is the format of the CLV system or the format of the CAV system. Then, the system controller 25 supplies an information signal of each corresponding rotational system to the servo controller 24.

The servo controller 24 generates a servo signal based on the information signal supplied thereto from the system controller 25 and a timing signal concerning rotational speed supplied thereto from the spindle motor 3 and supplies the servo signal thus generated to the spindle motor 3. The spindle motor 3 is driven under the control of the servo signal supplied thereto from the servo controller 24 so that the optical disc 1 can be rotated stably in a CLV or CAV system fashion.

To write an information signal in the optical disc 1 in a write-once fashion from this state will be described below. Data stored in the operation RAM provided within the host computer 32, for example, is supplied through the interface bus 31 to a write target recording and reproducing apparatus.

In this embodiment, to select a write target recording and reproducing apparatus, the host computer 32, for example, outputs a write request signal through the interface bus 31 connected to the 8 recording and reproducing apparatus to the write target recording and reproducing apparatus. Further, the host computer 32 transmits selection data in which device Nos. corresponding to the respective recording and reproducing apparatus are inserted into the starting portion of control data as a code to the write target recording and reproducing apparatus. The interface command controller 43 reads out this code and transmits the code thus read out through the system controller 25 and a device local bus 45 to the respective system controllers 25 one more time. The respective system controllers 25 verify the code and the device Nos. assigned to the respective recording and reproducing apparatus, and only the recording and reproducing apparatus whose device No. is agreed with the code can be supplied with write data supplied thereto through the system controller 25 from the host computer 32.

The write target recording and reproducing apparatus thus selected supplies the data supplied thereto from the host computer 32 through the interface command controller 43 and the system controller 25 to the modulator 23. At that time, the system controller 25 outputs a control signal used to set a recording laser output intensity to the laser beam controller (APC) 26. The laser beam controller 26 responds to the control signal input thereto from the system controller 25 to change comparison reference level of laser output to recording output level so that the laser output intensity can be stabilized to the recording output intensity.

The system controller 25 generates a signal representing a moving amount of the optical head 4 based on track address data of the data supplied thereto and supplies this signal to the optical head slide mechanism 11. The optical head slide mechanism 11 responds to the signal representing the moving amount of the optical head 4 input thereto to move and place the optical head 4 to a corresponding track. Then, the optical head 4 records the data supplied thereto from the host computer 32 on the corresponding track.

The optical head 4 sequentially records write data sequentially supplied thereto from the host computer 32 on the corresponding tracks of the corresponding optical discs 1. The write data thus sent from the host computer 32 are data that the user makes by the host computer 32 or data that the user makes by the host computer 32 on the basis of external source data. These write data are recorded on the user regions b (see FIG. 2) of the optical discs 1. The data recorded on the user regions b of the optical discs 1 are used as an extended ROM (read-only memory) of the host computer 32. Specifically, each of the recording and reproducing apparatus is used as an auxiliary memory apparatus (extended ROM) of the host computer 32.

As specific examples of data recorded on the respective optical discs 1, there might be enumerated background picture data, character data or dictionary data displayed on a CRT (cathode ray tube) when game software or software for word processing is operated.

Operation and signal processing for reproducing the optical disc 1 in which data is recorded in a write-once fashion will be described next. Prior to reading data, the system controller 25 outputs the control signal to the laser beam controller 26 so that the laser beam controller 26 may set intensity of reproducing laser output. The laser beam controller 26 responds to the control signal supplied thereto from the system controller 25 to change comparison reference level of laser output to reproducing output level so that the laser output is stabilized to the reproducing output.

When the user executes the game software or the software for word processing by input means 41, such as a keyboard or the like connected to the host computer 32, for example, in the detecting means 44 provided within the interface command controller 43, a program for actuating various software is stored in the operation RAM 34 from the program memory 33 through the control unit 36 and the program is executed from its start address via the calculating unit 35.

During this program is executed, a read-out request command for reading out the extended ROM data is issued and a data read-out request command is supplied to the corresponding recording and reproducing apparatus through an operation system (OS). This request is executed by supplying data composed of a data read-out request command, the device No. of the recording and reproducing apparatus and the read-out address through the interface bus 31 to 8 recording and reproducing apparatus.

When this read-out request is executed, time data representing 3 seconds is set to a counter (not shown) provided within the system controller 25 at the stage that a data readout command is supplied to a read target recording and reproducing apparatus. This counter subtracts time data based a clock signal input thereto from a timer 42, and outputs a reset signal to a control unit (not shown) of the system controller 25 when time data becomes zero. The control unit of the system controller 25 outputs a control signal concerning movement of the optical head 4 to the servo controller 24 based on the reset signal input thereto from the counter.

The servo controller 24 responds to the control signal input thereto from the system controller 25 to output a servo signal to the optical head slide mechanism 11 so that the optical head 4 is moved to the home position, e.g., region c shown hatched in FIG. 2, such as a track used as a spare space for data concerning defect management of a predetermined track of the system region a on which TOC data, for example, is recorded. Specifically, the region that is not the recording region of user data or the like us set as the home position c. However, such region should preferably be an region in which address data is recorded so that the next accessing can be carried out readily. The optical head slide mechanism 11 moves the optical head to the home position c based on the servo signal input thereto from the system controller 25.

According to a series of the above operation, the optical head is moved to the home position c if the next accessing is not made even after 3 seconds are elapsed from the previous access (read-out request). If the next accessing is made within 3 seconds from the previous accessing, the optical head 4 is not moved to the home position c but is moved onto the track to be accessed. Moreover, each time the accessing is requested, time data representing 3 seconds is registered in the counter provided within the system controller 25.

According to this embodiment, an access frequency counting program is read out from the program memory in accordance with the extended ROM data read-out request. This access frequency counting program thus read out is stored in the operation RAM 34 through the control unit 36 and executed.

A processing routine for processing the access frequency counting program will be described with reference to flowcharts of FIGS. 4 to 7 and various information tables of FIGS. 8A through 8D.

When this access frequency counting program is executed, two data table, one count file, one FIFO (first-in first-out) system latch region and one frequency detection flag are logically allocated to a predetermined array variable region (region used to store data) in the operation RAM 34.

Figure 8A:
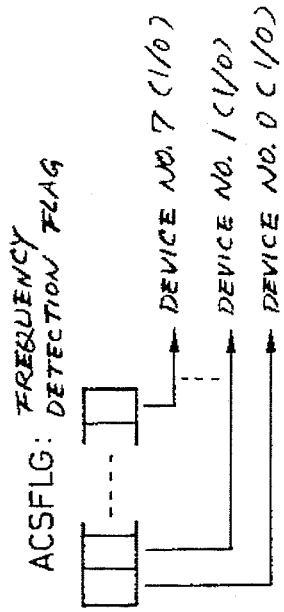
FIGS. 8A through 8D are schematic diagrams used to explain byte allocation of file groups used in the access frequency counting program, respectively.

A first data table is an access frequency counting table: ACSTBL and composed of 8 files (ACSFIL#0 to ACSFIL#7) in response to the 8 recording and reproducing apparatus as shown in FIG. 8A. Each file is composed of 64 records (ACSRCD#0 to ACSRCD#63), and each record is formed of 4 bytes. Each record ACSRD is composed of access number data CNT stored in the first 1 byte and track address data LBA stored in remaining 3 bytes. The access frequency counting table (ACSTBL) has a recording capacity of 8 files×64 records×4 bytes=2048 bytes.

Figure 8B:
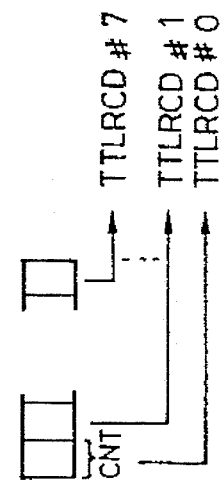

A second table data is a maximum access information table: MAXTBL and composed of 8 records (MAXRCD#0 to MAXRCD#7) in response to the 8 recording and reproducing apparatus as shown in FIG. 8B. Each record MAXRCD is formed of 4 bytes similarly to each record ACSRCD of the access frequency counting table (ACSTBL). Each record MAXRCD is composed of access number data CNT stored in the first 1 byte and track address data LBA stored in remaining 3 bytes. The maximum access information table (MAXTBL) has a recording capacity of 8 records×4 bytes=32 bytes.

Figure 8C:
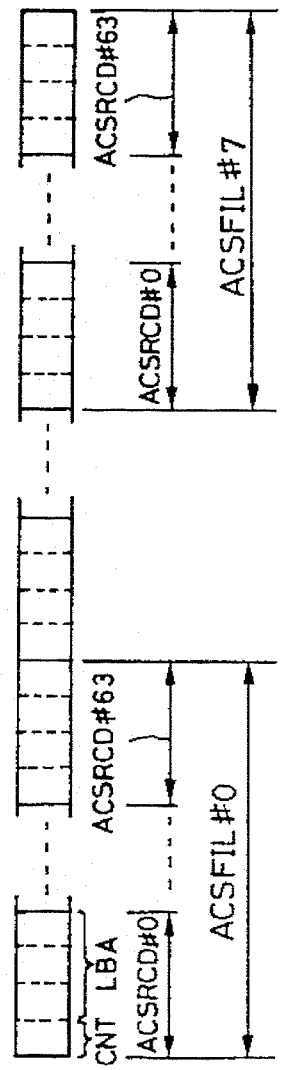

A count file is a data file: TTLCNT to count the number of access and composed of 8 records (TTLRCD#0 to TTL- CNT#7) in response to the 8 recording and reproducing apparatus as shown in FIG. 8C. Each record TTLCNT is composed of 1 byte and used to update the access number data CNT. Therefore, the count file (TTLCNT) has a recording capacity of 8 bytes.

In the latch region of the FIFO system, there are sequentially stored a pair of data composed of device No. DNO and track address data LBA which are requested in read by a program with priority higher than that of the access frequency counting program, though not shown. The device No. DNO and the track address data LBA stored in the latch region are shifted up to the start address each time the program is executed and used to identify the device No. DNO and the track address LBA.

Figure 8D:
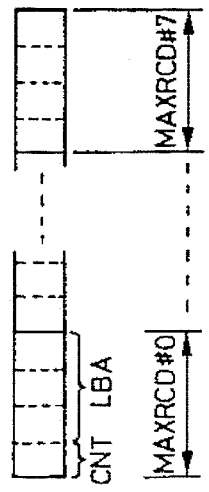

A frequency detection flag: ACSFLG is formed of 1 byte which are assigned to the 8 recording and reproducing apparatus bit by bit as shown in FIG. 8D. High "1" level represents a registered track address with maximum access frequency and low "0" level represents unregistered track address of maximum access frequency.

The access frequency counting program is successively activated after the host computer 32 accesses each recording and reproducing apparatus and reads out data from the read request address of the optical disc 1 in the recording and reproducing apparatus corresponding to a read target device No. DNO.

The processing order of this program will be described. As shown in the flowcharts (main routines) of FIGS. 4 to 6, initially, the read target device No. DNO and the track address data LBA are read out from the start address of the latch region and set to first and second index registers R1, R2 defined on the program in step S1. The processing proceeds to the next step S2, wherein an initial value (zero (0)) is stored in a third index register R3 defined on the program and in which the point number is stored.

Then, the processing proceeds to step S3, whereat the file ACSFIL corresponding to the device No. DNO is selected from the access frequency counting table (ACSTBL) by using the device No. stored in the first index register R1 as an index. Thereafter, the processing proceeds to step S4, whereat the record ACSRCD corresponding to the point number is selected from the corresponding file by using the point number stored in the third index register R3 as an index.

It is determined in decision step S5 whether or not the selected record ACSRCD has registered data. This identification is made based on the numerical value of the start byte of the selected record ACSRCD, i.e., whether the access number data CNT is 0 or not. If the access number data CNT is not 0, i.e., the selected record ACSRCD has the registered data as represented by a YES at decision step S5, then the processing proceeds to the next decision step S6. Because the record ACSRCD is registered from MAXRCD=0, it is possible to determine only by the numerical value of the start byte of the selected record ASCRCD whether the selected record ACSRCD has the registered data or not.

It is determined in decision step S6 whether or not the track address data LBA stored in the second index register R2 and the track address data LBA registered on the selected record ACSRCD are agreed with each other. If they are not agreed with each other as represented by a NO at decision step S6, then the processing proceeds to the next step S7, whereat the point number stored in the third index register R3 is updated by addition of 1.

It is determined in decision step S8 whether or not the confirmation of registered data on all records ACSRCD concerning the selected file ACSFIL is finished. This identification is carried out by determining whether or not the point number stored in the third index register R3 becomes 64. If the point number is not reached to 64 as represented by a NO at decision step S8, then the processing returns to step S4, whereat the record ACSRCD corresponding to the updated point number is selected. Then, the step S5 and the following steps are executed.

Figure 5:
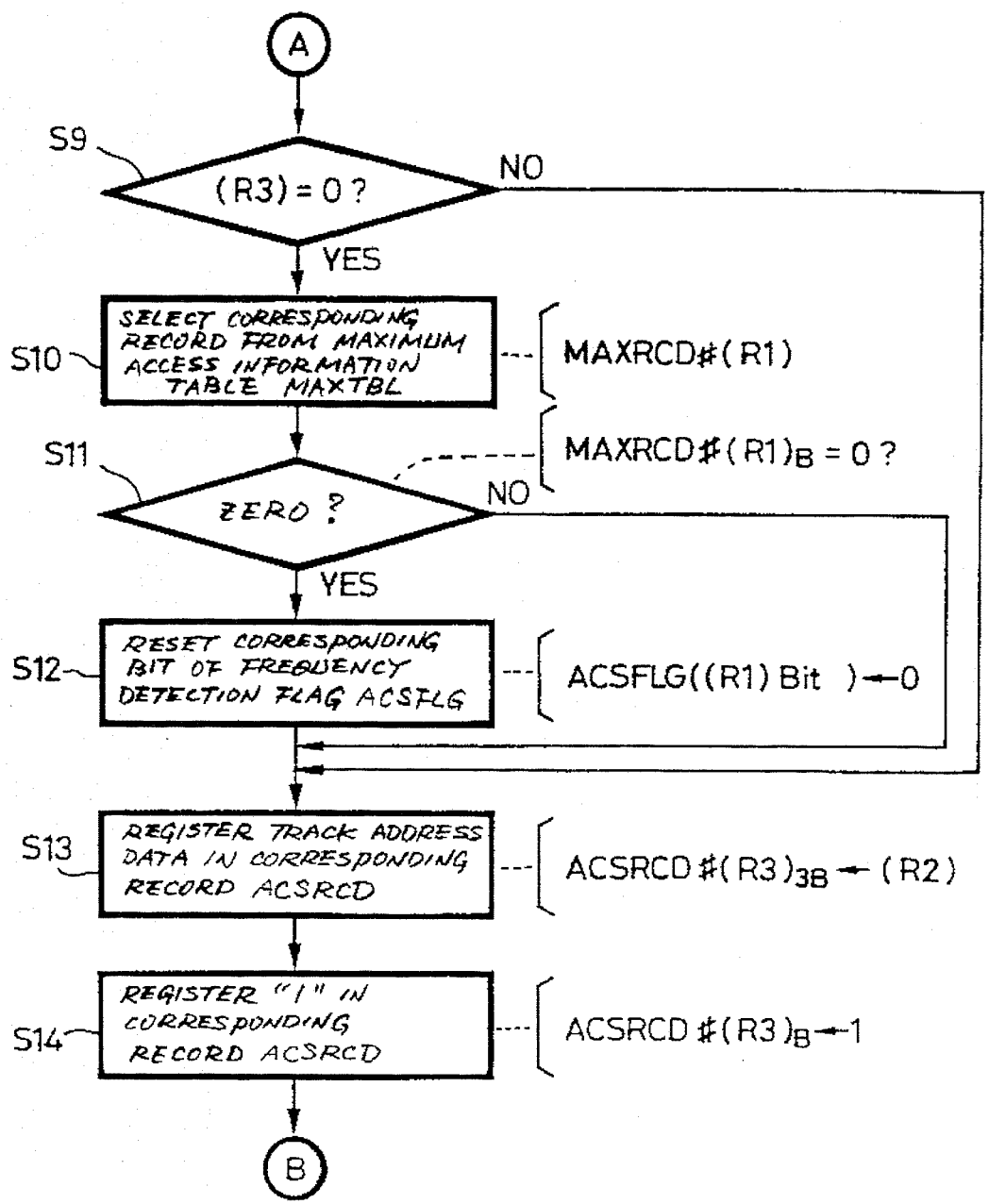

If the selected record ACSRCD has no registered data as represented by a NO at decision step S5, then the processing proceeds to decision step S9 shown in FIG. 5, whereat it is determined whether or not the point number within the third index register R3 is equal to 0 ((R3)=0). If the point number is zero as represented by a YES at decision step S9, this means that all records ACSRCD in the selected file ACSFIL have no registered data. Then, the processing proceeds to the next step S10. In this case, since data is registered in the file ACSFIL from the record ACSRCD#0, if R3 is "0", then all records ACSRCD have no registered data.

In step S10, a record corresponding to the device NO. DNO is selected from the maximum access information table MAXTBL by using the device No. DNO within the first index register R1 as an index. Then, it is determined in the next decision step S11 whether or not the content of the first byte of the selected record is zero. If it is zero as represented by a YES at decision step S11, the read target recording and reproducing apparatus determines that the track address of the maximum access number is not determined at all. Then, the processing proceeds to step S12, whereat a corresponding bit (i.e., bit corresponding to the device No. DNO) of the frequency detection flag (ACSFLG) is reset.

In the next step S13, read request track address data LBA stored in the second index register R2 is registered in the record ACSRCD selected from the access frequency counting table (ACSTBL). Thereafter, in step S14, "1" is registered in the start byte of the record ACSRCD as access number data CNT.

If on the other hand the number of points is not zero as represented by a NO at decision step S9, then the track address data LBA in the selected registered record ACSRCD and the read request track address data not agreed with each other but there exists the record having no registered data. In this case, the processing proceeds to step S13 and the following steps are repeated, wherein the read request track address data LBA stored in the second index register R2 is registered in the selected record ACSRCD, whereafter "1" is registered in the start byte of the record ACSRCD as the access number data CNT.

Figure 4:
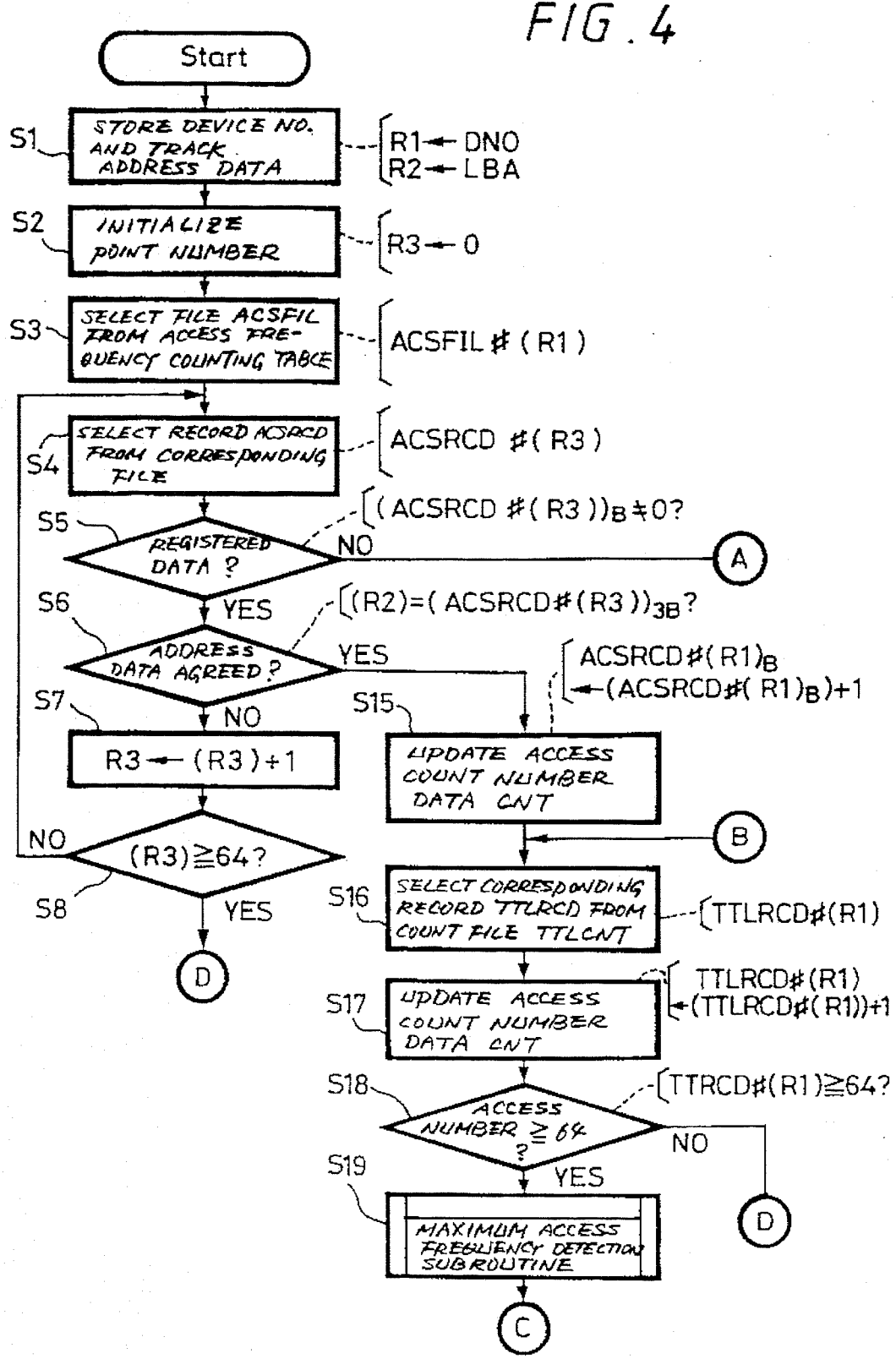
FIGS. 4, 5 and 6 are flowcharts showing a main routine of access frequency counting program executed by the interface controller, respectively.

In FIG. 4, it is determined in decision step S6 whether or not the track address data LBA stored in the second index register R2 and the track address data LBA registered in the selected record ACSRCD are the same. If a YES is output at decision step S6, then the processing proceeds to step S15, whereat the count number data CNT within the start byte in the selected record ACSRCD is updated by adding "1" thereto.

After step S14 or S15 is ended, the processing proceeds to step S16, whereat a record TTLRCD corresponding to the device No. DNO is selected from the count file TTLCNT by using the device NO. DNO stored in the first index register R1 as an index. Thereafter, the processing proceeds to step S17, whereat the access number CNT within the selected record TTLRCD is updated by addition of "1".

It is determined in the next decision step S18 whether or not access for the recording and reproducing apparatus corresponding to the corresponding device No. DNO 64 times is finished. This decision is made by determining whether or not the value within the record TTLRCD selected at step S16 is 64 or greater. If this value is 64 or greater as represented by a YES at decision step S18, then the processing proceeds to step S19, whereat the processing enters the maximum access frequency detection subroutine.

In the maximum access frequency detection subroutine, as shown in FIG. 7, in step S101, an initial value=0 is set to the fourth index register R4 defined on the program as the index point number. Further, in step S102, an initial value=0 is set to the maximum value register MAXR similarly defined on the program. The maximum value register MAXY is of 4 bytes composed of a start byte in which the maximum access number CNT is stored and following 3 bytes in which the maximum access frequency track address data LBA is stored.

In the next step S103, of the access frequency counting table (ACSTBL), with respect to the file ACSFIL selected at step S3, a record ACSRCD corresponding to the point number is selected from the corresponding file ACSFIL by using the point number within the 4th index register R4 as an index.

It is determined in decision step S4 whether or not the selected record ACSRCD is valid or invalid. This decision is made by determining whether or not the numerical value of the first byte of the selected record ACSRCD, i.e., the access number data CNT is "0". If the access number data CNT is not "0", then the selected record ACSRCD is valid and the processing proceeds to the next decision step S105.

It is determined in decision step S105 whether or not the access number stored in the record ACSRCD is larger than the maximum access number CNT of the first byte of the maximum value register MAXR. If the access number is larger as represented by a YES at decision step S105, then the processing proceeds to the next step S106, whereat the track address data LBA stored in the selected record ACSRCD is stored in the remaining 3 bytes of the maximum value register MAXR. Thereafter, the processing proceeds to step S107, wherein the access number CNT of the start byte of the selected record ACSRCD is overwritten in the region of the first byte of the maximum value register MAXR.

In the next step S108, the point number within the 4th index register R4 is updated by addition of "1". In the next decision step S109, it is determined whether or not it is carried out to confirm all records ACSRCD concerning the selected file ACSFIL have registered data. This decision is carried out by determining whether or not the point number stored in the 4th index register R4 becomes 64. If the point number doe not reach 64 as represented by a NO at decision step S109, then the processing returns to step S103, wherein the record ACSRCD corresponding to the updated point number is selected, whereafter the step S104 and the following steps are repeated.

If the access number CNT registered in the selected record ACSRCD is less than the maximum access number of the first byte of the maximum value register MAXR as represented by a NO at decision step S105, then the processing directly proceeds to step S108, wherein the point number within the 4th index register R4 is updated by addition of "1". Then, step S109 and the following steps are repeated.

If the point number stored in the 4th index register R4 is greater than 64 as represented by a YES at decision step S109, then the processing returns from this subroutine to the main routine. Then, the processing proceeds to the next step S20 shown in FIG. 6. Further, if the first byte of the selected record ACSRCD is 0 as represented by a NO at decision step S104, then this subroutine is forcibly ended and the processing proceeds to step S20 of the main routine.

Figure 6:
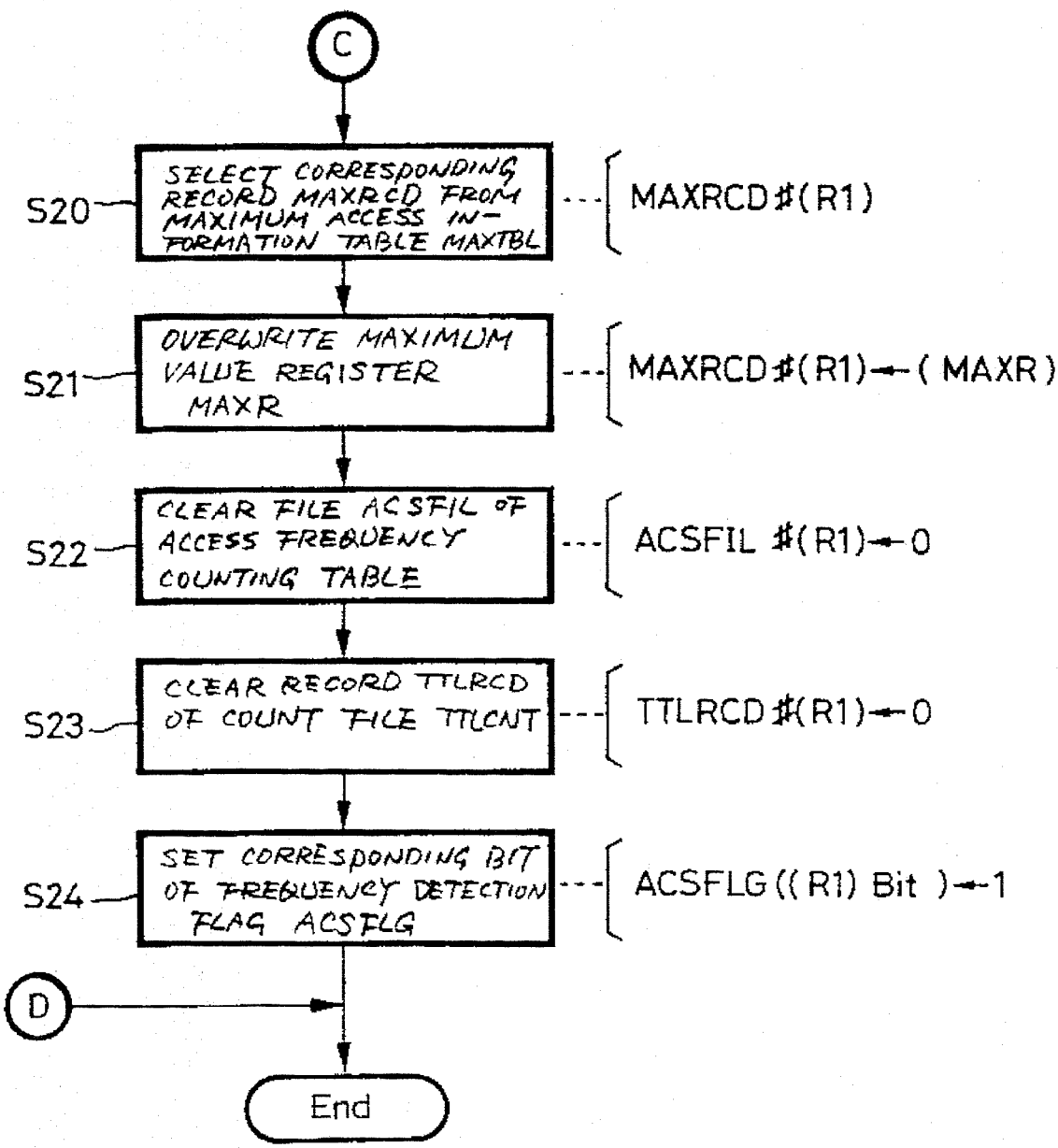

As shown in FIG. 6, in step S20, a record MAXRCD corresponding to the device No. DNO is selected from the maximum access information table (MAXTBL) by using the device No. DNO within the 1st index register R1 as an index.

Then, the processing proceeds to the next step S21, wherein the content of the maximum value register MAXR is overwritten on the selected record MAXRCD as it is. Specifically, the maximum access number CNT and the target track address LBA are stored in the selected record MAXRCD.

In the next step S22, of the access frequency counting table, the contents of the file ACSFIL selected at step S3 are all cleared. For example, "0" is stored in the whole region of the file ACSFIL. Then, the processing proceeds to step S23, an initial value=0 is stored in the record TTLRCD within the count file (TTLCNT) selected at step S16. The processing proceeds to the next step S24, whereat a corresponding bit (i.e., bit corresponding to the device No. DNO) of the frequency detection flag (ACSFLG) is set and then the processing routine of the access frequency counting program is ended.

Of the count file (TTLCNYT), if on the other hand the value of the record TTLRCD selected at step S16 is smaller than 64 as represented by a NO at decision step S18, then data necessary for detecting the maximum access frequency are not yet prepared, and the step S19 and the following steps are not executed. Thus, the processing routine of the access frequency counting programs is ended directly.

If the point number is equal to 64 as represented by a YES at decision step S8, then it is determined whether or not all records ACSRCD concerning the selected file ACSFIL have registered data. Since however the track address which is requested to be accessed this time is not registered in the file ACSFIL, the processing routine of the access frequency counting program is ended directly.

The access frequency counting program is successively activated after 8 recording and reproducing apparatus are accessed (accessed to read out) by the host computer 32. When the access request is made frequently, information concerning the access request (pair of data composed of the device No. DNO and the track address data LBA thus access-requested) is temporarily stored in the latch region of the FIFO system. Each time the access frequency counting program is activated, the information concerning the access request is sequentially read out from the latch region and processed.

The processing of the access frequency counting program will be summarized below. According to the access frequency counting program, after the access request from the host computer 32 is executed by the system controller 25, the track address of the access request is registered in the access frequency counting table (ACSTBL). Specifically, the access number data CNT and the track address data LBA are written in the access frequency counting table (ACSTBL). In this write processing, if the track address is already written in the table (ACSTBL), then the access number data CNT concerning such track address is updated and registered. This registration is carried out at the same time when the point number is updated. The 64 records are logically allocated to each file so that 64 kinds of different track addresses can be registered in the table (ACSTBL).

When the point number reaches to 64, the track address having the maximum access number and the access number are registered in the maximum access information table (MAXTBL). Thus, the track address of maximum frequency in the 64 accesses is registered in the maximum access information table (MAXTBL).

At that time, the contents of the access frequency counting table (ACSTBL) are cleared by the processing based on the above program, which means that the counting starts from the next access again. According to this method, it is possible to constantly detect the track address whose access frequency is maximum regardless of the cycle and order of the access. In addition, since the past 64 points are to be detected, there is then the advantage that, even if the track address of high access frequency is changed, the access frequency counting program according to the present invention can cope with such change readily.

Access operation done by the system controller 25 when the track address of maximum access frequency is detected by the access frequency counting program will be described below.

When the host computer 32 issues an access (read-out) request to the 8 recording and reproducing apparatus, frequency detection information INF is inserted into access request information (ACSINF) shown in FIG. 9 and each recording and reproducing apparatus is accessed. As shown in FIG. 9, the access request information (ACSINF) is composed of synchronizing (sync) information SYC, device No. DNO, the frequency detection information INF, track address data LBA, sector address data SBA, and read-out record length (sector length) LENGTH, from the start portion in that order.

Figure 10:
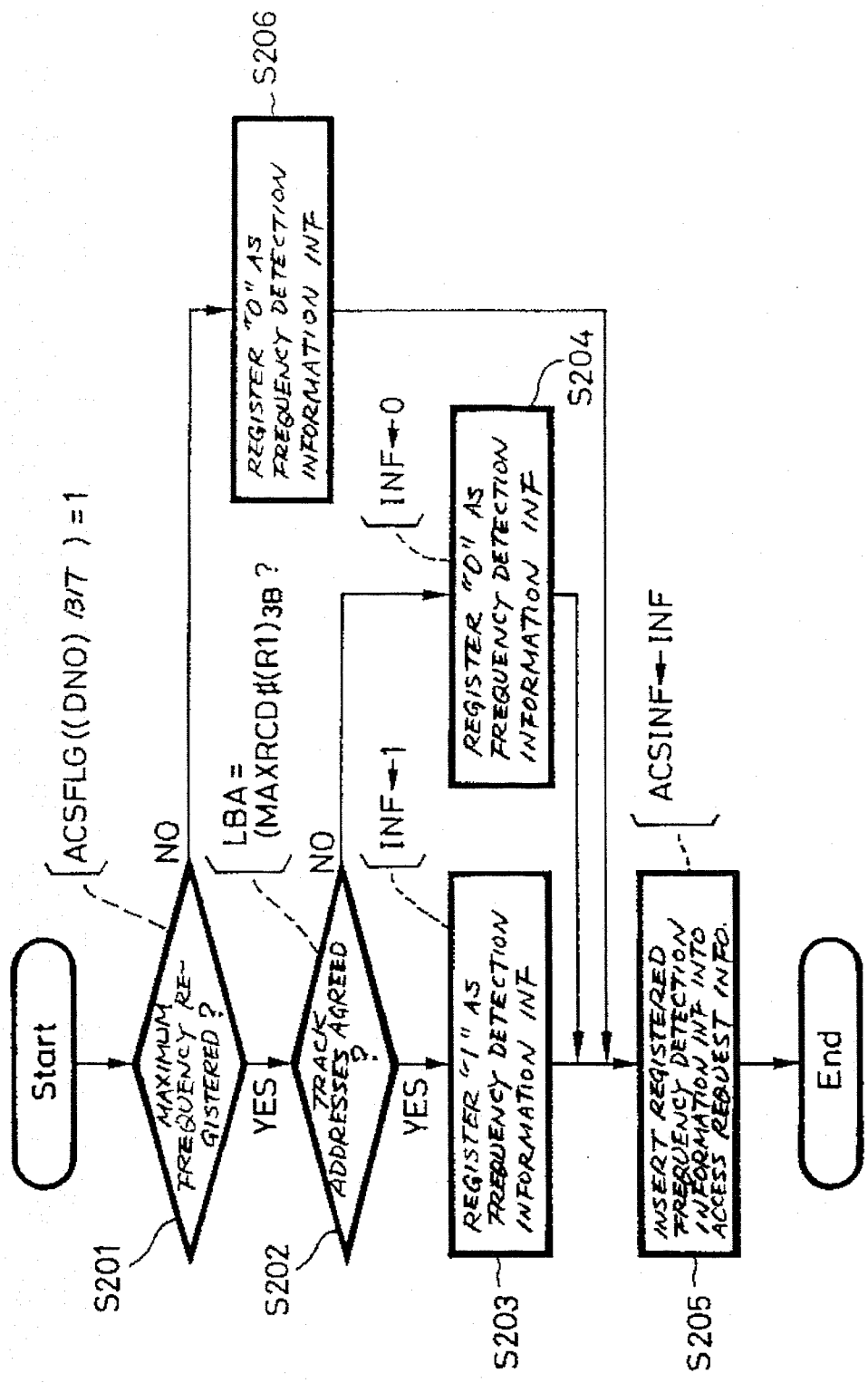
FIG. 10 is a flowchart showing a processing routine for inserting frequency detecting information INF to the access request information (ACSINF)

An example of an insertion processing of the frequency detection information INF will be described with reference to a flowchart of FIG. 10. Following the start of this flowchart, as shown in FIG. 10, it is determined in decision step S201 whether or not the track address of high access frequency is registered in the access target recording and reproducing apparatus. This decision is made by determining whether or not the bit corresponding to the access request device No. DNO of the frequency detection flag (ACSFLG) shown in FIG. 8D is "1" or "0".

If the target bit is "1" and the track address of high frequency is registered as represented by a YES at decision step S201, then the processing proceeds to the next decision step S202. It is determined in decision step S202 whether or not the access request track address is the same track address registered in the corresponding record MAXRCD of the maximum access information table (MAXTBL). If they are the same as represented by a YES at decision step S202, then the processing proceeds to step S203, whereat the frequency detection information INF is registered as "1". If they are not the same as represented by a NO, then the processing proceeds to step S204, whereat the frequency detection information INF is registered as "0".

Then, the processing proceeds to step S205, wherein the registered frequency detection information INF is inserted into the access request information shown in FIG. 9, and the processing is ended.

If on the other hand the track address of high access frequency is not registered in the access request target recording and reproducing apparatus as represented by a NO at decision step S201, i.e., the bit corresponding to the access request device No. DNO of the frequency detection flag (ACSFLG) shown in FIG. 8D is "0", then the processing proceeds to step S206, whereat "0" is registered as the frequency detection information INF. Thereafter, step S205 and the following steps are repeated.

When the insertion processing of the frequency detection information INF is ended, the access request information (ACSINF) thus made is transmitted through the interface bus 31 to each recording and reproducing apparatus.

Processing operation done by each recording and reproducing apparatus will be described with reference to a flowchart of FIG. 11. Initially, in step S301, each recording and reproducing apparatus temporarily stores the access request information (ACSINF) transmitted to the interface bus 31 in the RAM provided within the system controller 25. It is determined in decision step S302 whether or not its recording and reproducing apparatus is a target equipment of this time access request. This decision is made by comparing the device No. DNO of the recording and reproducing apparatus registered in the ROM provided within the ROM of the system controller 25 and the device No. DNO within the access request information (ACSINF) supplied thereto through the interface bus 31.

Then, only the recording and reproducing apparatus which is agreed with the device NO. DNO within the access request information (ACSINF) becomes the access request target equipment. In the next step S303, the system controller 25 of the corresponding apparatus reeds out data conforming to the request information from the optical disc in accordance with the access request information (ACSINF) latched in the RAM. In this data read-out processing, in order to detect the present position of the optical head on the track, data on the optical disc 1 is temporarily read out by the optical head 4, Then, data concerning the address is extracted from the data thus read out and supplied to the system controller 25. The system controller 25 calculates the moving amount of the optical head 4 by comparing the address thus read out and the access request address.

Thereafter, the moving amount data thus calculated is supplied to the servo controller 24 and the optical head 4 is placed at the access request track under the control of the servo controller 24. Simultaneously, the optical head 4 reads out the data on that track based on the access request information (sector address and record length). The data thus read out by the optical head 4 is converted by the demodulator 22 to predetermined reproduced data which is supplied through the interface bus 31 to the host computer 32.

In the next step S304, time data indicative of 3 seconds is set to the counter (not shown) provided within the system controller 25.

It is determined in the next decision step S305 by the system controller 25 on the basis of the frequency detection information INF provided within the access request information (ACSINF) latched in the RAM whether or not the accessed track is the track of maximum access frequency. This decision is made by detecting whether the content of the frequency detection information INF is "1" or "0".

If the accessed track is the track of maximum access frequency as represented by a YES at decision step S305, i.e., the content of the frequency detection information INF is "1", then the processing proceeds to step S306, wherein a random number is generated. The random number falls within a range of track number within a visual field of the objective lens 12 in the optical head 4, i.e., an operation range (region d shown hatched in FIG. 2) of the objective lens 12 by the tracking coil and the magnet of the two-dimensional actuator 13. In this embodiment, the track is ±50 track and a random number of arbitrary numerical value in the range of ±50 may be generated. If on the other hand the accessed track is not the track of maximum access frequency as represented by a NO at decision step S305, then the processing proceeds to step S308.

In step S307, the system controller 25 outputs the servo signal to the servo controller 24 to drive the two-dimensional actuator 13 such that the focusing of the objective lens 12 coincides the track of the numerical value indicated by the random number thus generated. When the two-dimensional actuator 13 is energized by the servo controller 24, the objective lens 12 is moved by a very small amount to the track array direction at the time unit of 1 msec/per track until the focusing of the objective lens 12 coincides with the track.

It is determined in the next decision step S308 whether or not the access request is made. If the access request is made as represented by a YES at decision step S308, then the processing is ended as it is and the processing corresponding to the next access request is executed. If on the other hand the access request is not made as represented by a NO at decision step S308, then the processing proceeds to the next decision step S309. It is determined in decision step S309 whether or not the time set by the step S304 is elapsed. If the predetermined time is not elapsed as represented by a NO at decision step S309, then the processing returns to step S306, whereat a random number is generated again. If the predetermined time is elapsed as represented by a YES at decision step S309, i.e., 3 seconds are elapsed after the previous access was made, then the processing proceeds to step S310, whereat the optical head 4 is moved to the home position a (see FIG. 2). Then, the processing is ended.

While an interrupt accompanying with the elapse of 3 seconds from the counter also is determined at step S309 as described above, the present invention is not limited thereto and the interrupt accompanying with the next access request, i.e., only step S308 may be determined as an interrupt target. In this case, the steps S309 and S310 may be omitted and the processing may directly be returned to step S306 if a NO is output at decision step S308.

As described above, according to the recording and reproducing apparatus of the present invention, when the access request is made on the track of high access frequency, after the access on the corresponding track is finished, the optical head 4 is not stopped on the track for a predetermined time but moved very slightly to the arbitrary track within the range d of ±50 tracks. Thus, until the interrupt accompanying with the elapse of 3 seconds from the counter or the interrupt accompanying with the next access request occurs, the optical head 4 is swingably moved around the track of the maximum access frequency.

Accordingly, it is possible to prevent in advance the optical disc 1 from being heated when the optical disc 1 is radiated at the same position by the laser beam L emitted from the optical head 4 for a long period of time. Specifically, the laser beam L emitted from the optical head 4 radiates around the track of the maximum access frequency so that radiation of the laser beam L can be avoided from being concentrated on the same track. In addition, since the movement of the optical head from the center of the track of the maximum access frequency to the surrounding tracks is determined by the random number, the laser beam L can be equivalently distributed to the surrounding tracks. Thus, it is possible to disperse the occurrence of heat generated by the laser beam L over the surrounding tracks. Also, it is possible to prevent heat from being accumulated on the optical disc when the laser beam L radiates the same track of the optical disc for a long period of time.

Further, since the optical head 4 is swingably moved around the track of the maximum access frequency, as compared with the case that the optical head 4 is frequently returned to the home position a, the movement of the optical head 4 in the next access and the access to the track of the maximum access frequency can be made at higher speed. Thus, the access speed of the optical head 4 can be increased.

A further embodiment of the present invention will be described below with reference to a flowchart of FIG. 12. In this embodiment, processings from steps S401 to S407 are similar to those of the embodiment shown in FIG. 11 and therefore need not be described. According to this embodiment, it is determined in decision step S408 whether or not the access request is made. If the access request is made as represented by a YES at decision step S408, then the processing is ended and the processing corresponding to the next access request is executed. If on the other hand the access request is not made as represented by a NO at decision step S408, then the processing proceeds to the next decision step S409. It is determined in decision step S409 whether or not the time set at step S404 is set. If the predetermined time is not elapsed as represented by a NO at decision step S409, then the processing returns to step S408. If the predetermined time is elapsed as represented by a YES at decision step S409, then the processing proceeds to step S410, whereat the optical head 4 is moved to the home position a and the processing is ended.

In the case of this embodiment, although only the track other than the maximum access track is accessed for 3 seconds, no such large influence is exerted upon that track. It is rather important that the maximum access track can be accessed in a short period of time when the maximum access track is accessed again within 3 seconds. Even when the maximum track is accessed continuously at the interval of less than 3 seconds, the optical head 4 is moved near the track. Thus, unlike the prior art, the optical head can be prevented from continuously accessing only the maximum access track.

Figure 11:
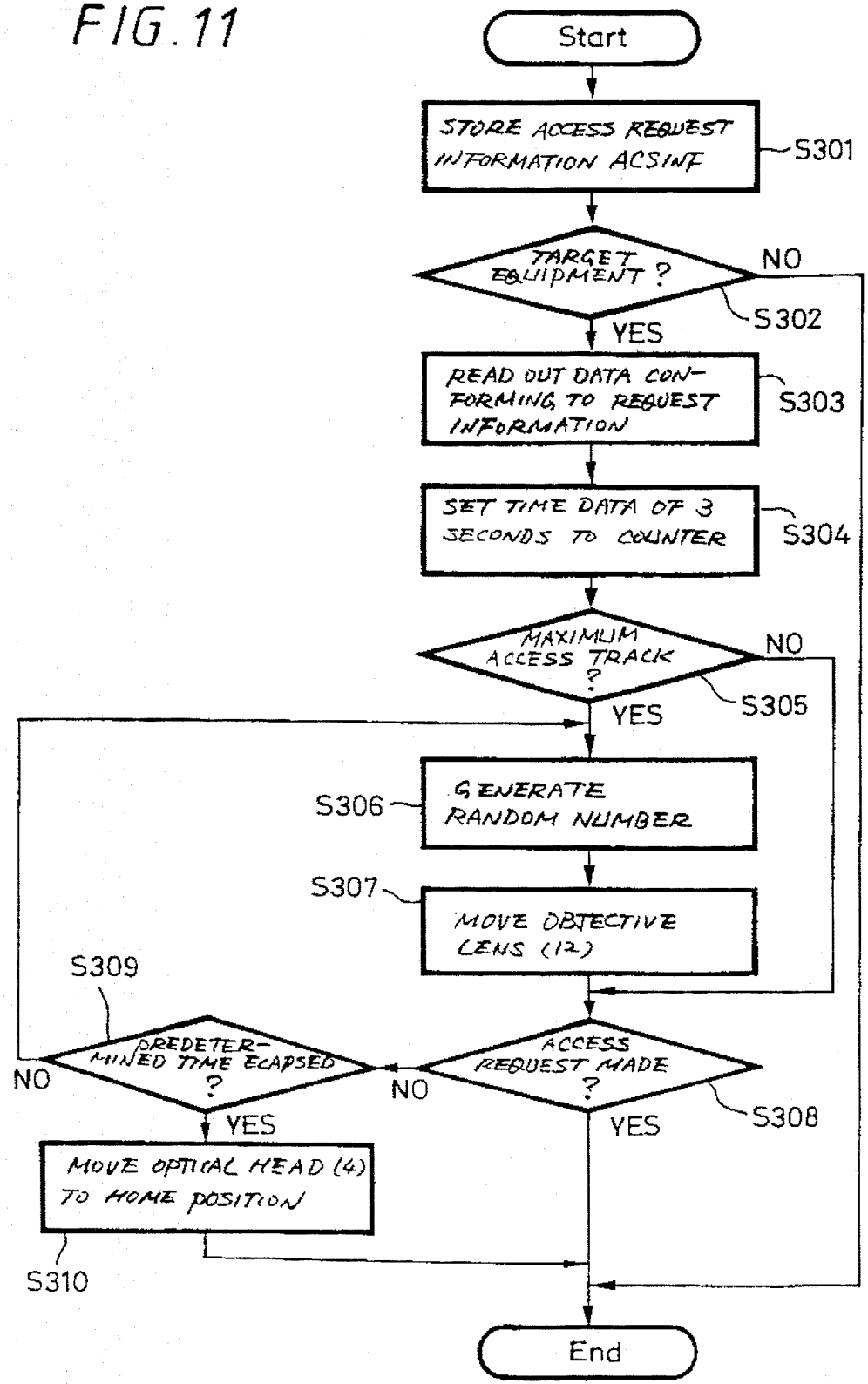
FIG. 11 is a flowchart showing processing operation of the recording and reproducing apparatus according to one embodiment of the present invention.
Figure 12:
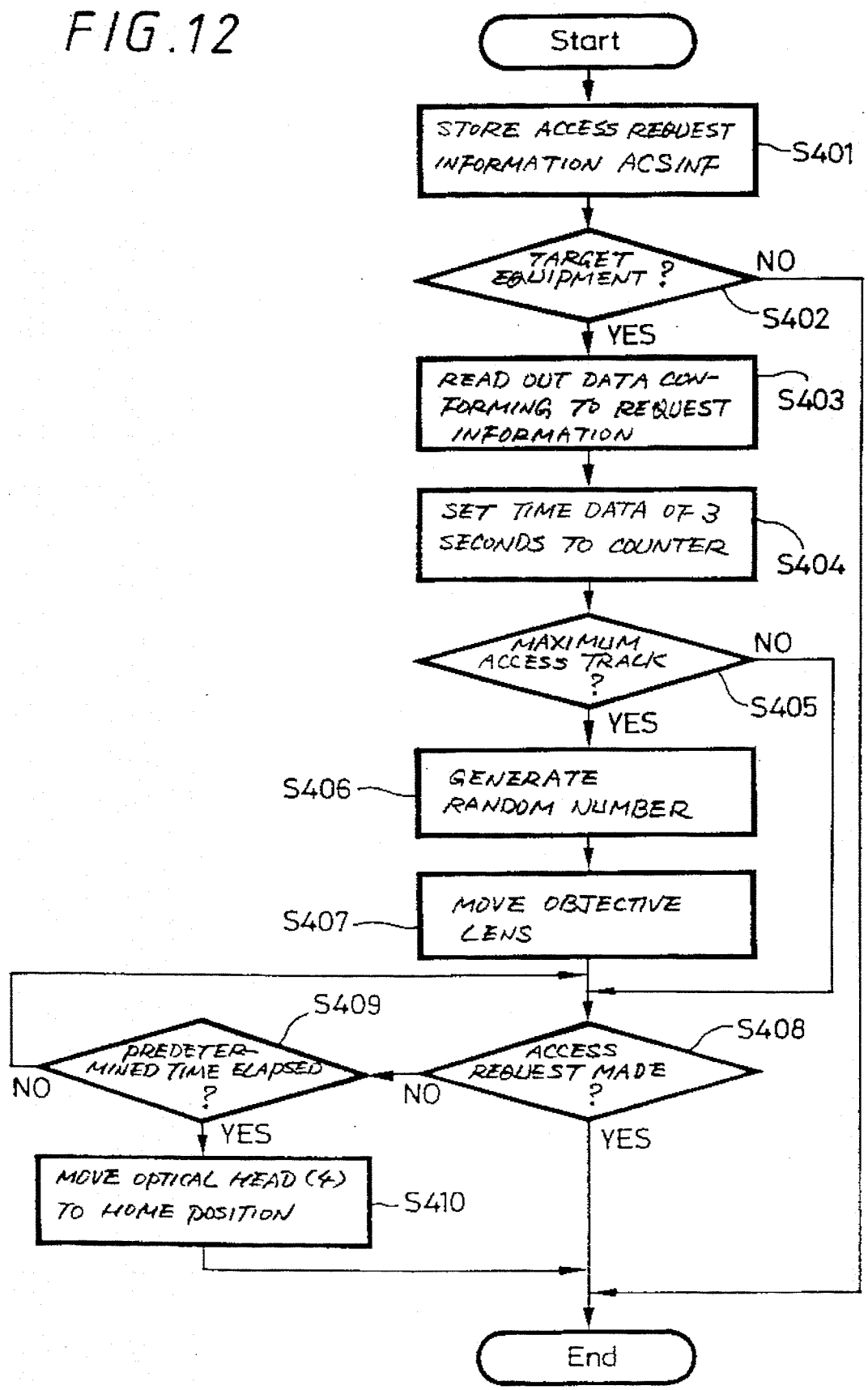
FIG. 12 is a flowchart showing processing operation of a recording and reproducing apparatus according to another embodiment of the present invention.

While the system controllers 25 execute the processings in the flowchart shown in FIGS. 11 and 12 as described above, the present invention is not limited thereto and the interface command controller 43 may execute such processings. In this case, the processings in the steps S302 and S402 may be replaced with processings in which a target equipment is selected.

While the time data indicative of 3 seconds is used as the data set to the counter as described above, the present invention is not limited thereto and the following variant also is possible. Because there is then no risk that heat is accumulated on the optical disc, the value of the time data can be increased and arbitrary values, such as 4 seconds and 6 seconds can be freely used as the time data. Thus, it is possible to make the access speed of the optical head 4 high.

While the phase-change type optical disc 1 is used as the recording medium as described above, the present invention is not limited thereto and a magneto-optical disc may be used as other recording media. Also in this case, it is possible to prevent in advance the film from being changed by heat accumulated in the magneto-optical disc.

While there is provided only one maximum access track, the present invention is not limited thereto and a plurality of maximum access tracks may of course be provided. In this case, since the maximum access track is updated and two tracks or more will not be the maximum access tracks for a long period of time. There is then the small possibility that a serious trouble will occur.

As described above, since the recording and reproducing apparatus according to the present invention comprises the access head for accessing an information signal from the recording medium, the detecting means for counting frequency with which the access head accesses the same recording unit region of the recording medium and detecting the recording unit region of high access frequency and the swinging means for swinging the access head on the recording medium until the next access request when the access head accesses the recording unit region of the high access frequency detected by the detecting means, it is possible to prevent the access head from staying at the same position for a long period of time. In addition, it is possible to achieve high access speed.

When the above-mentioned recording and reproducing apparatus comprises the moving means for moving the access head to the outside of the region in which the recording unit regions are collected on the basis of the detected result representing that the access head is stopped at least on the arbitrary recording unit region for a predetermined period of time, it becomes possible to reduce a power consumption and to extend mechanical lifetime of the servo system.

Further, when the swinging means is energized to swingably move the access head within the pseudo-region allocated about the recording unit region of the high access frequency detected by the detecting means, it is possible to simplify the arrangement of the recording and reproducing apparatus itself.

Furthermore, when the recording medium is formed of the phase-change type optical disc, the access head is formed of the optical head, the swinging means is formed of the actuator for swingably moving the objective lens of the optical head along the direction in which the tracks of the phase-change type optical disc are arrayed, the moving means is formed of the mechanism for moving the optical head in the diameter direction of the phase-change type optical disc and the recording unit region of the high access frequency detected by the detecting means is formed of the track of the phase-change type optical disc, it is possible to prevent in advance from heat being accumulated in the phase-change type optical disc when laser beam emitted from the optical head radiates the same position of the optical disc for a long period of time. In addition, the optical head can be moved at high speed to access the optical disc next and can access the track of high access frequency at high speed. Thus, the access speed of the optical head can be increased.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A reproducing apparatus comprising:

access means for accessing a recording medium so that an information signal is read out from said recording medium;

detecting means for counting frequency with which said access means accesses the same recording unit region of said recording medium and detecting a recording unit region of high access frequency;

random number generating means for generating a random number; and moving means for moving said access means to other recording unit region on said recording medium in response to a random number generated from said random number generating means after said access means accesses said recording unit region of high access frequency detected by said detecting means.

2. A reproducing apparatus according to claim 1, wherein said random number generating means generates a random number of value which falls within a predetermined value.

3. A reproducing apparatus according to claim 1, further comprising timer means for counting a time elapsed after said access means accesses a desired recording unit region and wherein said moving means moves said access means to other region than a user data region of said recording medium when said timer means detects that a predetermined time elapses.

4. A reproducing apparatus according to claim 1, wherein said random number generating means generates a random number at every predetermined time and said moving means moves said access means to a recording unit region based on said random number each time said random number generating means generates a random number.

5. A reproducing apparatus according to claim 4, wherein said random number generating means keeps generating said random number until the next access command is supplied.

6. A reproducing apparatus according to claim 1, wherein said detecting means detects only a recording unit region of maximum access frequency.

7. A reproducing apparatus according to claim 1, wherein said recording medium is a phase-change type optical disc and said access means is an optical pickup.

8. A reproducing apparatus according to claim 1, wherein said detecting means detects a recording unit region of high access frequency each time said recording medium is accessed the predetermined number of times.

9. A recording apparatus comprising:

access means for accessing a recording medium so that an information signal is read out from said recording medium;

detecting means for counting frequency with which said access means accesses the same recording unit region of said recording medium and detecting a recording unit region of high access frequency;

random number generating means for generating a random number; and moving means for moving said access means to other recording unit region on said recording medium in response to a random number generated from said random number generating means after said access means accesses said recording unit region of high access frequency detected by said detecting means.

10. A recording apparatus according to claim 9, wherein said random number generating means generates a random number of value which falls within a predetermined value.

11. A recording apparatus according to claim 9, further comprising timer means for counting a time elapsed after said access means accesses a desired recording unit region and wherein said moving means moves said access means to other region than a user data region of said recording medium when said timer means detects that a predetermined time elapses.

12. A recording apparatus according to claim 9, wherein said random number generating means generates a random number at every predetermined time and said moving means moves said access means to a recording unit region based on said random number each time said random number generating means generates a random number.

13. A recording apparatus according to claim 12, wherein said random number generating means keeps generating said random number until the next access command is supplied.

14. A recording apparatus according to claim 9, wherein said detecting means detects only a recording unit region of maximum access frequency.

15. A recording apparatus according to claim 9, wherein said recording medium is a phase-change type optical disc and said access means is an optical pickup.

16. A recording apparatus according to claim 9, wherein said detecting means detects a recording unit region of high access frequency each time said recording medium is accessed the predetermined number of times.

17. A reproducing apparatus comprising:

access means for accessing a recording medium so that an information signal is read out from said recording medium;

detecting means for counting frequency with which said access means accesses the same recording unit region of said recording medium and detecting a recording unit region of high access frequency; and moving means for sequentially moving said access means within a recording unit region near recording unit region of high access frequency on said recording medium after said access means accesses said recording unit region of high access frequency detected by said detecting means.

18. A reproducing apparatus according to claim 17, wherein said moving means sequentially moves said access means in a pseudo-region allocated about said recording unit region of high access frequency.

19. A reproducing apparatus according to claim 17, further comprising random number generating means for sequentially generating a random number and wherein said moving means moves said access means based on random numbers sequentially generated by said random number generating means.

20. A reproducing apparatus according to claim 17, further comprising timer means for counting a time elapsed after said access means accesses a desired recording unit region and wherein said moving means moves said access means to other region than a user data region of said recording medium when said timer means detects that a predetermined time elapses.

21. A reproducing apparatus according to claim 19, wherein said random number generating means keeps generating said random number until the next access command is supplied.

22. A reproducing apparatus according to claim 17, wherein said recording medium is a phase-change type optical disc and said access means is an optical pickup.

23. A reproducing apparatus according to claim 17, wherein said detecting means detects only a recording unit region of maximum access frequency.

24. A recording apparatus comprising:

access means for accessing a recording medium so that an information signal is read out from said recording medium;

detecting means for counting frequency with which said access means accesses the same recording unit region of said recording medium and detecting a recording unit region of high access frequency; and moving means for sequentially moving said access means within a recording unit region near recording unit region of high access frequency on said recording medium after said access means accesses said recording unit region of high access frequency detected by said detecting means.

25. A recording apparatus according to claim 24, wherein said moving means sequentially moves said access means in a pseudo-region allocated about said recording unit region of high access frequency.

26. A reproducing apparatus according to claim 24, further comprising random number generating means for sequentially generating a random number and wherein said moving means moves said access means based on random numbers sequentially generated by said random number generating means.

27. A recording apparatus according to claim 24, further comprising timer means for counting a time elapsed after said access means accesses a desired recording unit region and wherein said moving means moves said access means to other region than a user data region of said recording medium when said timer means detects that a predetermined time elapses.

28. A recording apparatus according to claim 26, wherein said random number generating means keeps generating said random number until the next access command is supplied.

29. A recording apparatus according to claim 24, wherein said recording medium is a phase-change type optical disc and said access means is an optical pickup.

30. A recording apparatus according to claim 24, wherein said detecting means detects only a recording unit region of maximum access frequency.

31. An access method of accessing a recording medium by access means, comprising the steps of:

(a) counting frequency with which the same recording unit region of a recording medium is accessed by access means and detecting a recording unit region of high access frequency;

(b) detecting whether or not said recording unit region of high access frequency detected at step (a) is accessed by said access means;

(c) generating a random number; and (d) moving said access means to other recording unit region on said recording medium in response to said random numbers after said recording unit region of high access frequency detected by said step (a) is accessed by said access means.

32. An access method of accessing a recording medium by access means, comprising the steps of:

(a) counting frequency with which the same recording unit region of a recording medium is accessed by access means and detecting a recording unit region of high access frequency;

(b) detecting whether or not said recording unit region of high access frequency detected at step (a) is accessed by said access means; and (c) sequentially moving said access means within a recording unit region near said recording unit region of high access frequency on said recording medium after said recording unit region of high access frequency detected by said step (a) is accessed by said access means.

* * * * *